(12) United States Patent
Li et al.

(10) Patent No.: US 12,085,722 B2
(45) Date of Patent: Sep. 10, 2024

(54) POSITIONING METHOD AND DEVICE

(71) Applicant: Beijing Zitiao Network Technology Co., Ltd., Beijing (CN)

(72) Inventors: Yunlong Li, Beijing (CN); Qinglin Chen, Beijing (CN); Cheng Chen, Beijing (CN); Junliang Shan, Beijing (CN); Tao Wu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/475,415

(22) Filed: Sep. 27, 2023

(65) Prior Publication Data
US 2024/0134204 A1 Apr. 25, 2024
US 2024/0231105 A9 Jul. 11, 2024

(30) Foreign Application Priority Data

Oct. 20, 2022 (CN) .......................... 202211289284.1

(51) Int. Cl.
*G02B 27/01* (2006.01)
*G02B 27/00* (2006.01)

(52) U.S. Cl.
CPC ..... *G02B 27/0172* (2013.01); *G02B 27/0093* (2013.01); *G02B 2027/0138* (2013.01); *G02B 2027/0178* (2013.01)

(58) Field of Classification Search
CPC ............ G02B 27/0172; G02B 27/0093; G02B 2027/0138; G02B 2027/0178
See application file for complete search history.

(56) References Cited

U.S. PATENT DOCUMENTS

| 10,540,812 | B1 * | 1/2020 | Yildiz | G06T 15/50 |
| 2020/0394408 | A1 * | 12/2020 | Sydorenko | G06V 30/142 |
| 2023/0199328 | A1 * | 6/2023 | Cho | H04N 23/71 |
| | | | | 348/241 |

FOREIGN PATENT DOCUMENTS

| CN | 108257112 A | 7/2018 |
| CN | 114489310 A | 5/2022 |
| WO | 2022057579 A | 3/2022 |

* cited by examiner

*Primary Examiner* — Sanghyuk Park
(74) *Attorney, Agent, or Firm* — Alleman Hall & Tuttle LLP

(57) ABSTRACT

A positioning method and device, the method including: extracting multiple light spots from a current image frame, wherein the current image frame is an image currently collected by an extended reality device; determining an interference light spot in the multiple light spots according to information about a historical interference light spot, and removing the interference light spot in the multiple light spots, recognizing whether there is a light spot of a luminous light source in remaining light spots after removing the interference light spot, wherein the luminous light source is a light source set on a human-computer interaction apparatus, and the human-computer interaction apparatus is used for a user to interact with the extended reality device; determining a current pose of the human-computer interaction apparatus according to the light spot of the luminous light source recognized in the remaining light spots.

20 Claims, 3 Drawing Sheets

POSITIONING METHOD AND DEVICE

CROSS-REFERENCE TO RELATED APPLICATION

This disclosure claims priority to Chinese Patent Application No. 202211289284.1, filed with the China National Intellectual Property Administration on Oct. 20, 2022 hereby incorporated by reference in its entirety.

TECHNICAL FIELD

Embodiments of the present disclosure relate to the technical field of image processing technology and, in particular, to a positioning method and device.

BACKGROUND

In an extended reality (including virtual reality (VR), augmented reality (AR) and mixed reality (MR)) scenario, human-computer interaction can be added to enable users to get an almost real interactive experience. In order to realize human-computer interaction in the above extended reality scenario, a human-computer interaction apparatus can be set up in the above scenario. The human-computer interaction apparatus may include, for example, a data glove, a three-bit mouse, a handle, etc. Sensors can be installed in the human-computer interaction apparatus to detect a pose of the human-computer interaction apparatus, so as to understand interactive instructions issued by the user through the human-computer interaction apparatus in the above mentioned scenario.

In related art, a luminous light source can be set in the human-computer interaction apparatus, and the pose of the human-computer interaction apparatus can be determined according to a light spot of the luminous light source in a collected image.

If there is an environment light source in the environment where the user experiences the extended reality scenario, the light spot of the environment light source will appear in the collected image, and the light spot of the environment light source can be called interference light spot.

The inventor found that, for multiple images collected, regarding at least one image prior to detection of the light spot of the luminous light source, all light spots of these images will be traversed to determine whether there is a light spot of the luminous light source in these images. However, it takes a large amount of calculation to traverse all the light spots of these images frame by frame to determine whether there is the light spot of the luminous light source in these images, which consumes more system resources, resulting in a longer time to start human-computer interaction in the extended real scenario.

SUMMARY

Embodiments of the present disclosure provide a positioning method and device, which are used to overcome the problem of increasing the amount of calculation caused by the existence of the light spot of the environmental light source.

According to a first aspect, one or more embodiments of the present disclosure provide a positioning method, including: extracting multiple light spots from a current image frame, wherein the current image frame is an image currently collected by an extended reality device; determining an interference light spot in the multiple light spots according to information about a historical interference light spot, and removing the interference light spot in the multiple light spots, wherein the historical interference light spot is obtained by recognizing a light spot of a historical image frame; recognizing whether there is a light spot of a luminous light source in remaining light spots after removing the interference light spot, wherein the luminous light source is a light source set on a human-computer interaction apparatus, and the human-computer interaction apparatus is used for a user to interact with the extended reality device; determining a current pose of the human-computer interaction apparatus according to the light spot of the luminous light source recognized in the remaining light spots.

According to a second aspect, one or more embodiments of the present disclosure provide a positioning device, including: an extracting unit, configured to extract multiple light spots from the current image frame, wherein the current image frame is an image currently collected by an extended reality device; a first determining unit, configured to determine an interference light spot in the multiple light spots according to information about a historical interference light spot, and removing the interference light spot in the multiple light spots, wherein the historical interference light spot is obtained by recognizing a light spot of a historical image frame; an recognizing unit, configured to recognize whether there is a light spot of a luminous light source in remaining light spots after removing the interference light spot, wherein the luminous light source is a light source set on a human-computer interaction apparatus, and the human-computer interaction apparatus is used for a user to interact with the extended reality device; a second determining unit, configured to determine a current pose of the human-computer interaction apparatus according to the light spot of the luminous light source recognized in the remaining light spots.

According to a third aspect, one or more embodiments of the present disclosure provide an electronic device, including a processor and a memory;

a memory stores computer execution instructions;

a processor executes the computer execution instructions stored in the memory, so that the processor executes the positioning method as described in the first aspect and various possible designs of the first aspect.

According to a fourth aspect, one or more embodiments of the present disclosure provide a computer-readable storage medium in which computer execution instructions are stored; when a processor executes the computer execution instructions, the positioning method as described in the first aspect and various possible designs of the first aspect is implemented.

According to a fifth aspect, one or more embodiments of the present disclosure provide a computer program product including a computer program, when the computer program is executed by a processor, the positioning method as described in the first aspect and various possible designs of the first aspect is implemented.

Embodiments of the present disclosure provide a positioning method and device, according to the method, the interference light spot can be recognized by using the historical image frame, and can be removed from the current light spot, and whether there is the light spot of the luminous light source on the human-computer interaction apparatus in the remaining light spots can be recognized, and then the current pose of the human-computer interaction apparatus can be determined according to the light spot of the luminous light source recognized in the remaining light spots. Compared with a calculation amount of the method in which the light spot of the luminous light source is determined from multiple light spots in the current image frame by using only the current image frame and the pose of the human-computer interaction apparatus is determined according to the light spot of the luminous light source, by using the method provided by the embodiments, the number of light spots processed when determining the light spot of the luminous light source from the image frame is reduced, furthermore, the calculation amount of determining the pose of the human-computer interaction apparatus from the light spot in the current image frame is reduced, the time for starting human-computer interaction in extended reality is shortened, and the efficiency of human-computer interaction in extended reality is improved.

BRIEF DESCRIPTION OF DRAWINGS

To describe the technical solutions in embodiments of the present disclosure or in the related art more clearly, in the following, the accompanying drawings needed for describing the embodiments or the existing art will be briefly introduced. The accompanying drawings in the following description illustrate merely some embodiments of the present disclosure, and persons of ordinary skill in the art may still derive other drawings from these accompanying drawings without paying creative effort.

DESCRIPTION OF EMBODIMENTS

To make the objectives, technical solutions, and advantages of embodiments of the present disclosure clearer, in the following, the technical solutions in the embodiments of the present disclosure will be clearly and comprehensively described with reference to the accompanying drawings of the embodiments of the present disclosure. The described embodiments are merely a part rather than all embodiments of the present disclosure. All other embodiments obtained by persons of ordinary skill in the art based on the embodiments of the present disclosure without paying creative effort shall fall within the protection scope of the present disclosure.

Figure 1:
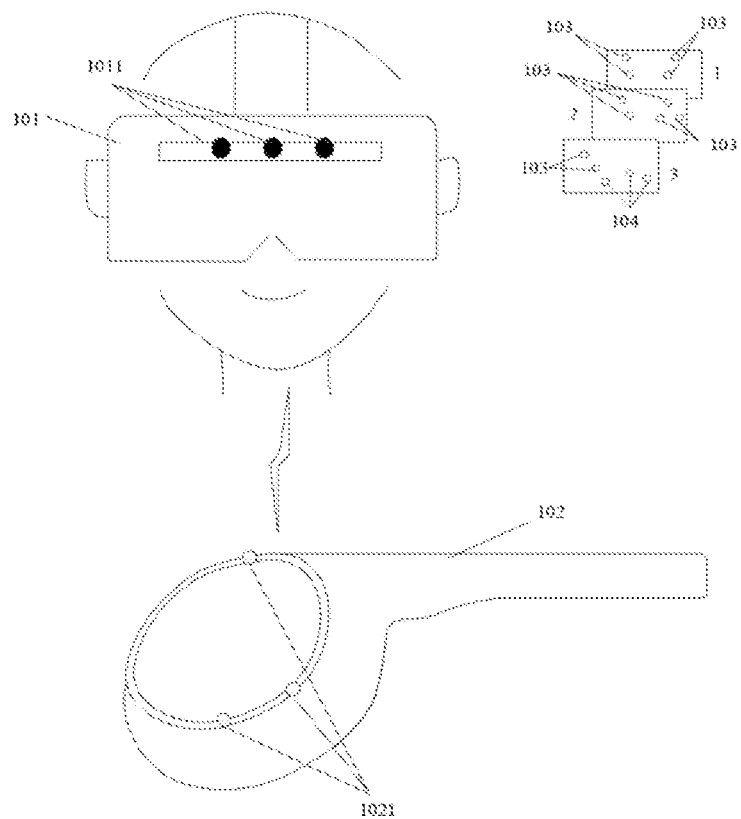
FIG. 1 is a schematic diagram of determining a pose of a human-computer interaction apparatus in a virtual reality scenario in related art.

FIG. 1 is a schematic diagram of determining a pose of a human-computer interaction apparatus in a virtual reality scenario in related art. As shown in FIG. 1, the extended reality system includes, for example, a head-mounted extended reality device 101 and a human-computer interaction apparatus (handle) 102. An image collecting device (camera) 1011 can be arranged in the head-mounted extended reality device 101. A luminous light source 1021 can be set on the handle. The camera 1011 in the head-mounted extended reality device 101 can collect environmental images in real time. The handle 102 can be manipulated when a user interacts with an extended reality scenario. A data processing device of the extended reality system needs to detect whether a light spot of the luminous light source 1021 exists in the environment image from the above environment image. If so, the pose of the handle is determined based on the light spot of the luminous light source 1021; otherwise, the data processing device detects whether a light spot of the luminous light source exists in the next environment image. For example, the camera 1011 has collected three frames of environment images, namely, an image 1, an image 2 and an image 3. Four light spots can be recognized from the image 1. The above data processing equipment needs to determine whether there is a light spot of the luminous light source in the four light spots 103. Specifically, a position of each luminous light source in the three-dimensional space can be determined by using current images collected by the three cameras, and whether the light source is the light spot of the luminous light source can be determined according to the position of the luminous light source in the three-dimensional space. The recognition results of the four light spots 103 in the image 1 are all that the light spots are light spots of the environment light source (interference light spots). Five light spots are recognized in the image 2 and five light spots are recognized in the image 3. From the image 2 to the image 3, the operation of determining whether the light spot is the light spot of the luminous light source in the image 1 can be repeated respectively to determine whether the light spot of the luminous light source is included in FIGS. 2 and 3. It is determined that the five light spots 103 in the result image 2 are all interference light spots. In the image 3, two light spots 103 are interference light spots, and three light spots 104 are light spots of the luminous light sources. After determining that the three light spots 104 in FIG. 3 are the light spot of the luminous light sources, the serial numbers of the luminous light sources corresponding to the three light spots can be determined respectively, and then the spatial position of the human-computer interaction apparatus can be determined based on a conversion relationship between the two-dimensional coordinates of the projection (a light spot of a light source) in the image coordinate system and the three-dimensional coordinate of the entity corresponding to the projection in the space. It can be seen that in the process of determining the pose of the human-computer interaction apparatus, the process of determining whether there is a light spot of a luminous light source in the multiple frames of image consumes a lot of computing resources. As a result, it takes a long time to initiate human-computer interaction in the extended reality.

In order to solve the above problems, the present disclosure provides the following solutions.

Figure 2:
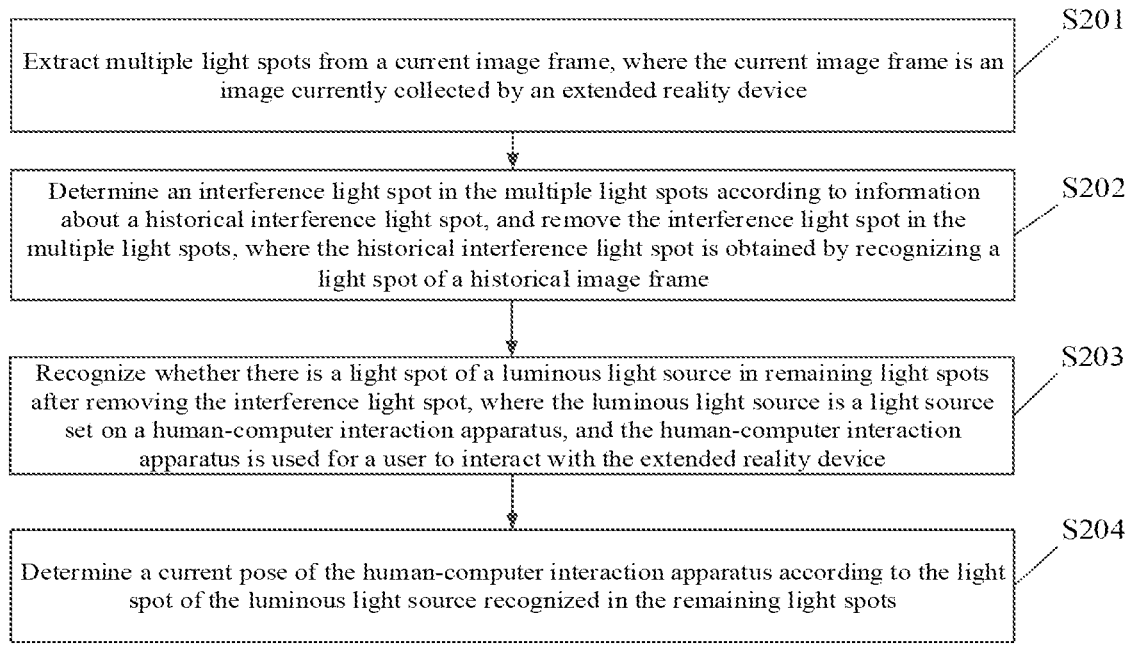
FIG. 2 is a flowchart I of a positioning method provided by one or more embodiments of the present disclosure.
Figure 3:
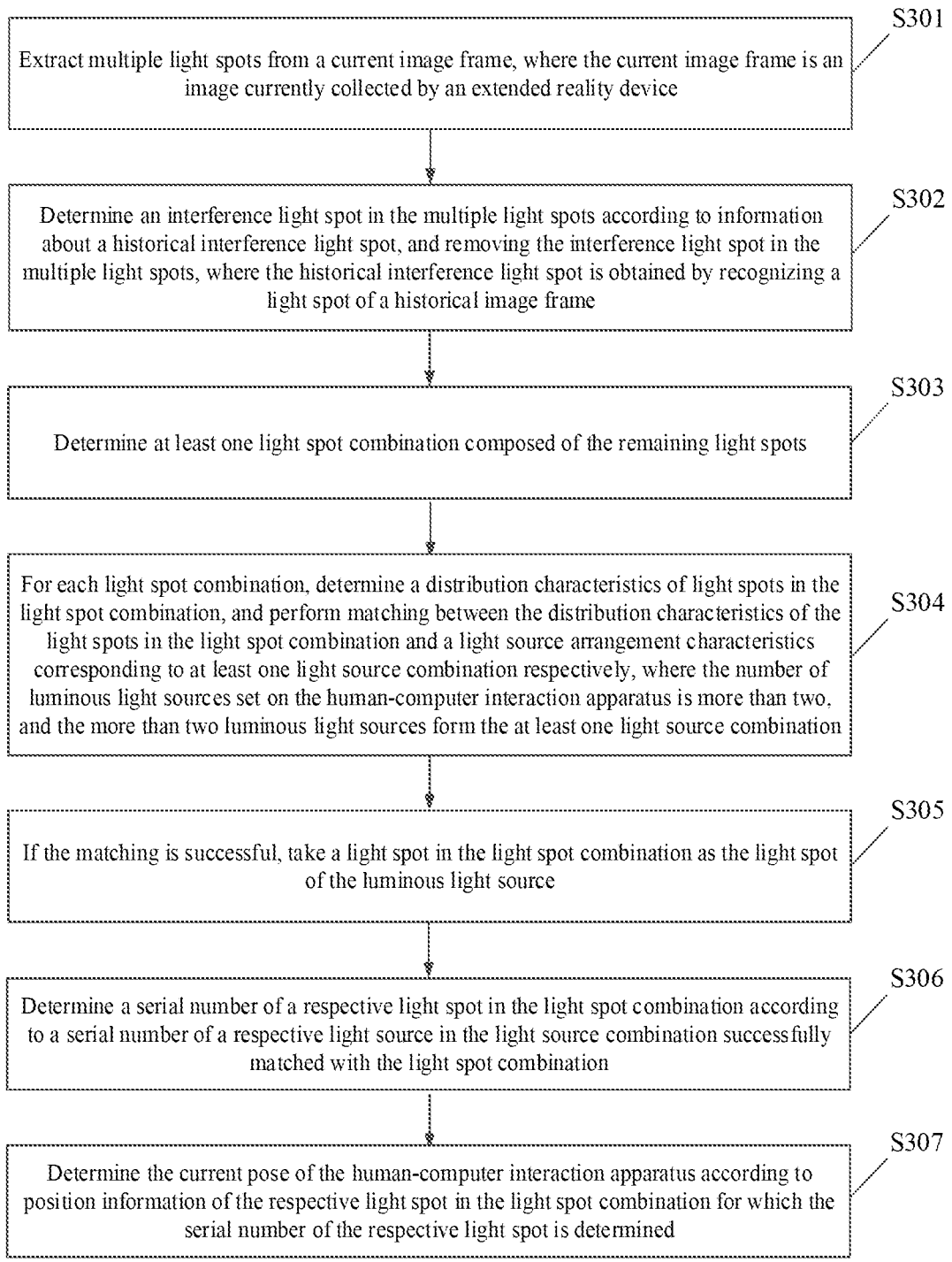
FIG. 3 is a flowchart II of a positioning method provided by one or more embodiments of the present disclosure.

Refer to FIG. 2, which provides a flowchart I of a positioning method provided by one or more embodiments of the present disclosure. The method in this embodiment may be applied to a terminal device or server that provides extended reality services, and the positioning method includes the following.

S201: extract multiple light spots from a current image frame, wherein the current image frame is an image currently collected by an extended reality device.

The positioning method provided in the present disclosure can be applied to human-computer interaction scenarios in extended reality (including virtual reality augmented reality and mixed reality). In these human-computer interaction scenarios, the luminous light source set in the human-computer interaction apparatus can be used for positioning. The human-computer interaction apparatus may be a human-computer interaction apparatus applied in extended reality.

The current image frame can be collected by the image collecting device carried in the extended reality device.

The multiple light spots mentioned above may include light spots of the environment light source(s) and/or the luminous light source(s) on human-computer interaction apparatus. The light spot here can be a projection in the image collected when the environment light source or the luminous light source set on the human-computer interaction apparatus is working.

Image processing methods can be used to extract the multiple light spots from the current image frame.

S202: determine an interference light spot in the multiple light spots according to information about a historical interference light spot, and remove the interference light spot in the multiple light spots, where the historical interference light spot is obtained by recognizing a light spot of a historical image frame.

If there is a light spot of an environment light source in the collected image frame, the two-dimensional coordinate of the light spot in the image frame is converted to the three-dimensional space through coordinate transformation (such as Perspective-n-Point, PnP transformation), to obtain the three-dimensional coordinate, the obtained three-dimensional coordinate is the same or similar to the three-dimensional coordinate of the environment light source.

Information about a historical interference light spot can be stored in advance. The information about the historical interference light spot includes a three-dimensional coordinate of an environment light source corresponding to the historical interference light spot in the world coordinate system. The three-dimensional coordinate of the environment light source corresponding to the historical interference light spot in the world coordinate system is determined based on the historical image frame.

Since the three-dimensional coordinate of the environment light source in the world coordinate system is fixed, the three-dimensional coordinates of the light spots in different image frames for the same environmental light source are the same after being transformed from two-dimensional coordinates to the world coordinate system. According to this feature, it is possible to determine whether the current light spot is an interference light spot according to the three-dimensional coordinate of the current light spot in the world coordinate system and the three-dimensional coordinate of the stored historical interference light spot in the world coordinate system.

The two-dimensional coordinates of the above multiple light spots in the current image frame can be transformed, and the two-dimensional coordinates of the multiple light spots can be transformed into the three-dimensional coordinates in the world coordinate system. Then, the three-dimensional coordinates of the multiple light spots are matched with the three-dimensional coordinate(s) of the stored historical interference light spot(s). If the three-dimensional coordinate of a current light spot is successfully matched with the three-dimensional coordinate(s) of the stored historical interference light spot(s), the current light spot is an interference light spot.

As an implementation manner, the above steps S202 includes the following sub-steps.

Firstly, map an interference light spot in a result of historical light spot recognition to the current image frame.

Secondly, recognize the interference light spot from the multiple current light spots according to a result of the mapping.

An example is taken where the virtual reality device is a head-mounted virtual reality device, the world coordinate system can be a three-dimensional coordinate system established by the head-mounted virtual reality device using a default initial point as the origin.

Specifically, the coordinate of the historical interference light spot in the world coordinate system can be mapped to a pixel coordinate system of the current image frame according to a preset coordinate transformation relationship, so as to determine the position of the historical interference light spot in the current image frame, and recognize the interference light spot in the multiple light spots of the current image frame.

If the mapping result of a historical interference light spot in the current image frame coincides with a position of a light spot in the current image frame, or a distance between the mapping result and a position of a light spot in the current image frame is less than a preset distance threshold, the light spot in the current image frame can be determined as the same interference light spot as the historical interference light spot.

If the interference light spot is determined in the multiple light spots, the interference light spot can be removed from the multiple light spots. As an implementation manner, after determining at least one interference light spot in the current image frame, data corresponding to the interference light spot can be erased from image data of the current image frame. As another implementation manner, after determining the interference light spot in the current image frame, image data corresponding to the interference light spot can be labeled as interference light spot. Furthermore, these interference light spots are ignored when determining the light spot of the luminous light source.

S203: recognize whether there is a light spot of a luminous light source in remaining light spots after removing the interference light spot, where the luminous light source is a light source set on the human-computer interaction apparatus, and the human-computer interaction apparatus is used for a user to interact with the extended reality device.

There is no limit to the number of luminous light sources. The luminous light source can be, for example, a light emitting diode (LED). The luminous light source can emit light, and the image of the human-computer interaction apparatus collected by the image collecting device can present the light spot corresponding to the luminous light source.

The human-computer interaction apparatus here can be an apparatus for the user to interact with the extended reality device, such as a handle, glove, etc., for interacting with the extended reality device.

In other application scenarios, if the number of environment light sources is known, and the known number of interference light spots have been removed from multiple light spots. If the known number of interference light spots are removed, and there are still light spots, it can be considered that the remaining light spot(s) is(are) the light spot(s) of the luminous light source(s).

In practice, it is possible to recognize, according to an arrangement characteristics of luminous light sources on the human-computer interaction apparatus, whether there is the light spot of the luminous light source from the multiple light spots in the current image.

Illustratively, if multiple luminous light sources are arranged in a straight line on the human-computer interaction apparatus, the luminous light spots presented by the multiple light sources in the current image can be on a straight line. It is possible to recognize light spots distributed on a straight line from the remaining light spots, and the number of light spots on a straight line is the same as the number of luminous light sources set on the human-computer interaction apparatus, then the multiple light spots on a straight line are determined as the light spots of the luminous light sources.

S204: determine a current pose of the human-computer interaction apparatus according to the light spot of the luminous light source recognized in the remaining light spots.

If the light spot of the luminous light source is recognized in step S203, the current pose of the human-computer interaction apparatus can be determined according to the light spot of the luminous light source.

In some application scenarios, if the number of luminous light sources is one, and the light spot of the luminous light source is determined according to the above steps S201~S203, then the spatial position of the human-computer interaction apparatus can be determined according to the coordinate of the light spot in the pixel coordinate system of the image frame, and the transformation relationship between the two-dimensional coordinate of the projection (a light spot of a light source) in the image coordinate system and the three-dimensional coordinate of the entity corresponding to the projection in the space.

The transformation relationship here for example, can be a PnP transformation relationship.

As an implementation manner, a first coordinate system corresponding to the human-computer interaction apparatus can be established by taking a reference point of the human-computer interaction apparatus (such as a geometric center point of the human-computer interaction apparatus) as the origin. The first three-dimensional coordinate of the luminous light source in the first coordinate system can be determined.

In the current image frame, the pixel coordinate of the light spot of the luminous light source can be determined, that is, a first two-dimensional coordinate of the light spot of the luminous light source in the pixel coordinate system corresponding to the current image frame can be determined.

The three-dimensional coordinate of the image collecting device which is used for collecting image frames in the first coordinate system can be determined according to the transformation relationship between the two-dimensional coordinate of the projection (the center point of the light spot) in the image coordinate system and the three-dimensional coordinate of the entity corresponding to the projection (the center point of the luminous light source) in the space (the three-dimensional coordinate in the first coordinate system) and the first two-dimensional coordinate. Correspondingly, the three-dimensional coordinate of the human-computer interaction apparatus in the coordinate system where the image collecting device is located can be known.

Among the implementations, step S203 above includes:
recognizing, based on an arrangement characteristics of luminous light sources set on the human-computer interaction apparatus, whether there is the light spot of the luminous light source from the remaining light spots;

the above step S204 includes:
determining a serial number corresponding to a respective light spot of a luminous light source according to serial numbers of multiple luminous light sources forming the arrangement characteristics;
determining the pose of the human-computer interaction apparatus according to position information of the light spot of the luminous light source whose serial number is determined.

In these implementations, the number of luminous light sources is more than one.

The arrangement characteristics of the more than one luminous light source includes but is not limited to the distance(s) and relative position(s) between different luminous light sources. It should be noted that the determination of the position of the luminous light source involved in the present disclosure refers to determining the position of the central point of the luminous light source, and the distance between different luminous light sources refers to the distance between central points of different luminous light sources. The position of the light spot refers to the position of the center point of the light spot, and the distance between two light spots is the distance between center points of the two light spots.

More than one luminous light source has their corresponding light spots in the current image frame, and a serial number of a luminous light source corresponding to a respective light spot of the luminous light source can be determined. The serial number of the luminous light source corresponding to respective light spots of the luminous light sources can be regarded as the serial numbers corresponding to the light spots of the luminous light sources. If the corresponding relationship between two or more luminous light sources and the light spots of the two or more luminous light sources is known, then the PnP algorithm can be invoked to obtain the spatial positioning position of the image collecting device in the coordinate system of the human-computer interaction apparatus. Correspondingly, the three-dimensional coordinate of the human-computer interaction apparatus in the coordinate system where the image collecting device is located can be known. That is, the position of the human-computer interaction apparatus relative to the extended reality device.

Take three luminous light sources L1, L2 and L3 set on the human-computer interaction apparatus as an example, distances between different luminous light sources in the above arrangement characteristics can include: a distance D12 between the luminous light source L1 and the luminous light source L2, a distance D13 between the luminous light source L1 and the luminous light source L3, and a distance D23 between the luminous light source L2 and the luminous light source L3. The relative positions between different luminous sources include: a distance difference between the luminous source L1 and the luminous source L2 on three coordinate axes: a distance difference $\Delta x12$ on the x axis, a distance difference $\Delta y12$ on the y axis, and a distance difference $\Delta z12$ on the z axis. A distance difference between the luminous light source L1 and the luminous light source L3 on three coordinate axes: a distance difference $\Delta x13$ on the x axis, a distance difference $\Delta y13$ on the y axis, and a distance difference $\Delta z13$ on the z axis. A distance difference between the luminous light source L2 and the luminous light source L3 on three coordinate axes: a distance difference $\Delta x23$ on the x axis, a distance difference $\Delta y23$ on the y axis, and a distance difference $\Delta z23$ on the z axis.

Because the above two or more luminous light sources have the above arrangement characteristics, in the image collected by the image collecting device, the corresponding light spots of the two or more luminous light sources also have a distribution characteristics related to the above arrangement characteristics. Illustratively, the projections of the multiple luminous light sources L1, L2, L3, L4 on the x axis are located on the same line, and in the luminous light sources L1, L2, L3, L4, the distance between the luminous light sources L1 and L2 is d12; the distance between the luminous light sources L2 and L3 is d23; the distance between the luminous light source L3 and L4 is d34, d12, d23 and d34 are set according to a distribution of small, medium and large. In some application scenarios, four current light spots on a straight line can be found in multiple current light spots, and in the four current light spots, if the spacing between every two adjacent light spots also meets the distribution of small, medium and large, the serial number of the luminous light source corresponding to the respective light spot can be further determined according to the distribution of the spacing of the light spots. If in the four light spots, the distance between a light spot 1 and a light spot 2 is less than the distance between the light spot 2 and a light spot 3, and the distance between the light spot 2 and the light spot 3 is less than the distance between the light spot 3 and a light spot 4, the serial number corresponding to the light spot 1 is L1; the serial number of the light spot 2 is L2; the serial number of the light spot 3 is L3; the serial number of the light spot 4 is L4.

In these implementation manners, the accuracy of recognizing the light spot of the luminous light source can be improved by recognizing whether there is the light spot of the luminous light source in the remaining light spots through the arrangement characteristics of the luminous light sources. In addition, the accuracy of the serial number corresponding to the respective light spot of the luminescent luminous light source determined based on the serial numbers corresponding to respective luminous light sources forming the above arrangement characteristics is relatively high, and then the accuracy of determining the pose of the human-computer interaction apparatus based on the light spot of the luminous light source whose serial number is determined is also relatively high.

In some embodiments, interaction information may be determined based on the current pose and displayed by the extended reality device. The interaction information here can include, for example, adding a virtual object to a virtual reality scenario, instructing the virtual object to move to a target location in the virtual reality scenario, performing a preset action on the virtual object, and so on. The interaction information here can be set according to specific application scenarios, which is not limited herein.

In some embodiments, the above positioning method further includes: if the light spot of the luminous light source is not recognized in the remaining light spots, taking the remaining light spots as interference light spots corresponding to the current image frame, and updating the information about the historical interference light spot according to information about the interference light spots corresponding to the current image frame.

In other words, if there is no luminous light source in the remaining light spots after the interference light spot corresponding to the historical image frame is removed in the current image frame, the remaining light spot is taken as the interference light spot corresponding to the current image frame. The information about the interference light spot of the current image frame is added to the information about the historical interference light spot to provide support for the recognition of interference light spot in subsequent image frames, so as to reduce the calculation amount for recognizing the light spot of the luminous light source from light spots of subsequent images.

In the positioning method provided in the embodiment, firstly, the interference light spot is removed from multiple light spots of the current image frame by using the interference light spot of the historical image frame, and then whether there is the light spot of the luminous light source on the human-computer interaction apparatus is recognized from the remaining light spots; finally, the current pose of the human-computer interaction apparatus is determined according to the light spot of the luminous light source recognized in the remaining light spots. According to the above method, by using the interference light spot recognized from the historical image frame, the number of light spots processed in the current image frame is reduced, and the number of light spots needed to be processed for recognizing the light spot of the luminous light source from multiple light spots of the image frame is reduced, thus reducing the resource consumption required for initiating human-computer interaction and reducing the time required for initiating human-computer interaction, and improving the efficiency of human-computer interaction in extended reality.

Please refer to FIG. 3, which shows a flowchart II of a positioning method provided by one or more embodiments of the present disclosure. The method in this embodiment can be applied to a terminal device or a server, and the positioning method includes the following.

S301: extract multiple light spots from a current image frame, where the current image frame is an image currently collected by an extended reality device.

S302: determine an interference light spot in the multiple light spots according to information about a historical interference light spot, and removing the interference light spot in the multiple light spots, where the historical interference light spot is obtained by recognizing a light spot of a historical image frame.

In this embodiment, the specific implementation of the above steps S301 and S302 can be the same or similar to the specific implementation of steps S201 and S202 as shown in FIG. 2, which is not described here.

S303: determine at least one light spot combination composed of the remaining light spots.

Specifically, take two light spots as one light spot combination, all the combinations with two light spots can be determined from multiple remaining light spots; take three light spots as one light spot combination, all the combinations with three light spots are determined from the multiple remaining light spots. And so on until all light spot combinations corresponding to the number of luminous light sources set on the human-computer interaction apparatus are determined.

S304: for each light spot combination, determine a distribution characteristics of light spots in the light spot combination, and perform matching between the distribution characteristics of the light spots in the light spot combination and a light source arrangement characteristics corresponding to at least one light source combination respectively, where the number of luminous light sources set on the human-computer interaction apparatus is more than two, and the more than two luminous light sources form the at least one light source combination.

S305: if the matching is successful, take a light spot in the light spot combination as the light spot of the luminous light source.

S306: determine a serial number of a respective light spot in the light spot combination according to a serial number of a respective light source in the light source combination successfully matched with the light spot combination.

The light source arrangement characteristics corresponding to the at least one light source combination can be stored in advance. The light source arrangement characteristics of a light source combination includes the distance(s) and relative position(s) between light sources in the light source combination. The at least one light source combination includes a light source combination composed of two light sources, a light source combination composed of three light sources, a light source combination composed of all light sources, etc. The light source arrangement characteristics in each light source combination can be stored in advance.

Take the light spot combination composed of three light spots as an example, the distribution characteristics of the three light spots in the combination is determined, including: distances and relative positions between each two light spots, etc. Matching is performed between the distribution characteristics of the three light spots in the combination and the arrangement characteristics of the combination of the three light spots in the luminous light source. For the matching process and the process of determining the serial number, reference can be made to the relevant part of the embodiment shown in FIG. 2, and will not be described here.

S307: determine the current pose of the human-computer interaction apparatus according to position information of the respective light spot in the light spot combination for which the serial number of the respective light spot is determined.

Reference can be made to the description of the relevant part of S204 in the embodiment shown in FIG. 2 for the above step S307, and will not be described here.

Compared with the embodiment shown in FIG. 2, the present embodiment highlights the steps of locating the light spot combination successfully matched with the light source combination of the luminous light source from multiple light spot combinations, and positioning the human-computer interaction apparatus by using the light spot combination. Because it is a light spot combination for positioning determined by matching multiple light spot combinations with the light source combinations, the obtained light spot combination for positioning is more accurate, and the positioning result obtained by using this light spot combination for positioning the human-computer interaction apparatus is also more accurate.

In some implementations of this embodiment, in S304, if there are more than two light spot combinations successfully matched with the light source arrangement characteristics corresponding to the at least one light source combination respectively, the positioning method also includes the following steps.

Firstly, determine a target light spot combination from the more than two light spot combinations according to a preset matching threshold.

If there are multiple light spot combinations that are matched successfully, a mapping relationship between the arrangement characteristics of the luminous light sources and the distribution characteristics of the light spots of the luminous light sources in the current image frame can be determined according to at least one light spot combination. According to the mapping relationship, the differences between the distribution characteristics of the light spots in the two light spot combinations and the arrangement characteristics of the luminous light sources are calculated. The light spot combination whose difference is less than the preset matching threshold is taken as the target light spot combination. The preset matching threshold is set based on application scenarios, which is not limited herein.

Of course, the light spot combination with the smallest difference can be taken as the target light spot combination.

Secondly, determine a serial number of a respective light spot in the target light spot combination according to a serial number of a luminous light source in a light source combination corresponding to the target light spot combination.

Finally, determine the current pose of the human-computer interaction apparatus according to position information of the respective light spot in the target light spot combination for which the serial number of the respective light spot is determined.

For the specific implementation of determining the serial number of the light spot and determining the current pose of the human-computer interaction apparatus according to the target light spot combination for which the serial number of the light spot is determined, reference can be made to the description of the relevant part of the embodiment shown in FIG. 2, and will not be repeated here.

In these implementation manners, the target light spot combination is determined according to the preset matching threshold from multiple candidate light spot combinations successfully matched with the combinations of luminous light sources, so that the matching degree between the target light spot combination determined and the luminous light source is relatively high, that is, the determined light spot combination for positioning has a relatively high accuracy. The accuracy of the pose of the human-computer interaction apparatus determined based on the target light spot combination is also relatively high.

In an implementation, the above positioning method also includes: for a next image frame, determine a pose of the human-computer interaction apparatus corresponding to the next image frame using position information of the respective light spot in the target light spot combination.

Usually, the acquisition time interval of the two adjacent image frames is tens of milliseconds, and the difference of positions of light spots of the luminous light source is not large in the two adjacent image frames. The target light spot combination recognized in the current image frame can be used for tracking the light spot of the luminous light source in the next image frame.

In other words, after the target light spot combination is determined in the current image frame, it is possible to use the target light spot combination in the next image frame for tracking the light spot of the luminous light source in the next image frame, and then determine, according to the position information of the target light spot combination in the next image frame, the pose of the human-computer interaction apparatus corresponding to the next image frame. In this way, the calculation amount of determining the pose of the human-computer interaction apparatus based on the light spot of the luminous light source in the subsequent image can be reduced.

Figure 4:
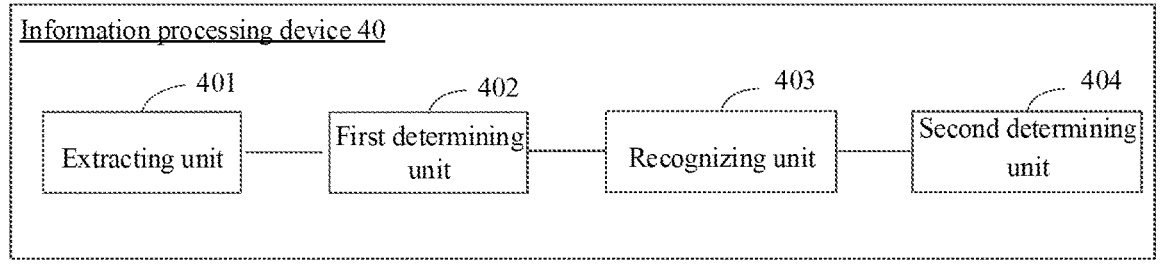
FIG. 4 is a schematic structural diagram of a positioning device provided by one or more embodiments of the present disclosure.

Corresponding to the positioning method of the above embodiment, FIG. 4 is a schematic structural diagram of a positioning device provided by one or more embodiments of the present disclosure. For illustrative purposes, only the portions relevant to this embodiment of the present disclosure are shown. Referring to FIG. 4, the device 40 includes an extracting unit 401, a first determining unit 402, a recognizing unit 403, and a second determining unit 404.

The extracting unit 401 is configured to extract multiple light spots from a current image frame, wherein the current image frame is an image currently collected by an extended reality device; the first determining unit 402 is configured to determine an interference light spot in the multiple light spots according to information about a historical interference light spot, and removing the interference light spot in the multiple light spots, wherein the historical interference light spot is obtained by recognizing a light spot of a historical image frame; the recognizing unit 403 is configured to recognize whether there is a light spot of a luminous light source in remaining light spots after removing the interference light spot, wherein the luminous light source is a light source set on a human-computer interaction apparatus, and the human-computer interaction apparatus is used for a user to interact with the extended reality device; the second determining unit 404 is configured to determine a current pose of the human-computer interaction apparatus according to the light spot of the luminous light source recognized in the remaining light spots.

In one or more embodiments of the present disclosure, the first determining unit 402 is specifically configured to: map an interference light spot in a result of historical light spot recognition to the current image frame; and recognize the interference light spot from the multiple current light spots according to a result of the mapping.

In one or more embodiments of the present disclosure, the recognizing unit 403 is specifically configured to recognize, based on an arrangement characteristics of luminous light sources set on the human-computer interaction apparatus, whether there is the light spot of the luminous light source from the remaining light spots; and the second determining unit 404 is specifically configured to determine a serial number corresponding to a respective light spot of a luminous light source according to serial numbers of multiple luminous light sources forming the arrangement characteristics; determining the pose of the human-computer interaction apparatus according to position information of the light spot of the luminous light source whose serial number is determined.

In one or more embodiments of the present disclosure, the number of luminous light sources set on the human-computer interaction apparatus is more than two, the more than two luminous light sources form at least one light source combination; the recognizing unit 403 is specifically configured to determine at least one light spot combination of composed of the remaining light spots; for each light spot combination: determining a distribution characteristics of light spots in the light spot combination, and performing matching between the distribution characteristics of the light spots in the light spot combination and a light source arrangement characteristics corresponding to the at least one light source combination respectively; if the matching is successful, taking a light spot in the light spot combination as the light spot of the luminous light source; the second determining unit 404 is specifically configured to determine a serial number of a respective light spot in the light spot combination according to a serial number of a respective light source in a light source combination successfully matched with the light spot combination; determine the current pose of the human-computer interaction apparatus according to position information of the respective light spot in the light spot combination for which the serial number of the respective light spot is determined.

In one or more embodiments of the present disclosure, there are more than two light spot combinations successfully matched with the light source arrangement characteristics corresponding to the at least one light source combination respectively; the second determining unit 404 is specifically configured to determine a target light spot combination from the more than two light spot combinations according to a preset matching threshold; determine a serial number of a respective light spot in the target light spot combination according to a serial number of a light source combination corresponding to the target light spot combination; determine the current pose of the human-computer interaction apparatus according to position information of the respective light spot in the target light spot combination for which the serial number of the respective light spot is determined.

In one or more embodiments of the present disclosure, the second determining unit 404 is specifically configured to determine, for a next image frame, a pose of the human-computer interaction apparatus corresponding to the next image frame using position information of the respective light spot in the target light spot combination.

In one or more embodiments of the present disclosure, the positioning device further includes an updating unit (not shown in the drawings). The updating unit is configured to: if the light spot of the luminous light source is not recognized in the remaining light spots, take the remaining light spots as interference light spots corresponding to the current image frame, and update the information about the historical interference light spot according to information about the interference light spots corresponding to the current image frame.

An electronic device is also provided for the realization of the above embodiment.

Figure 5:
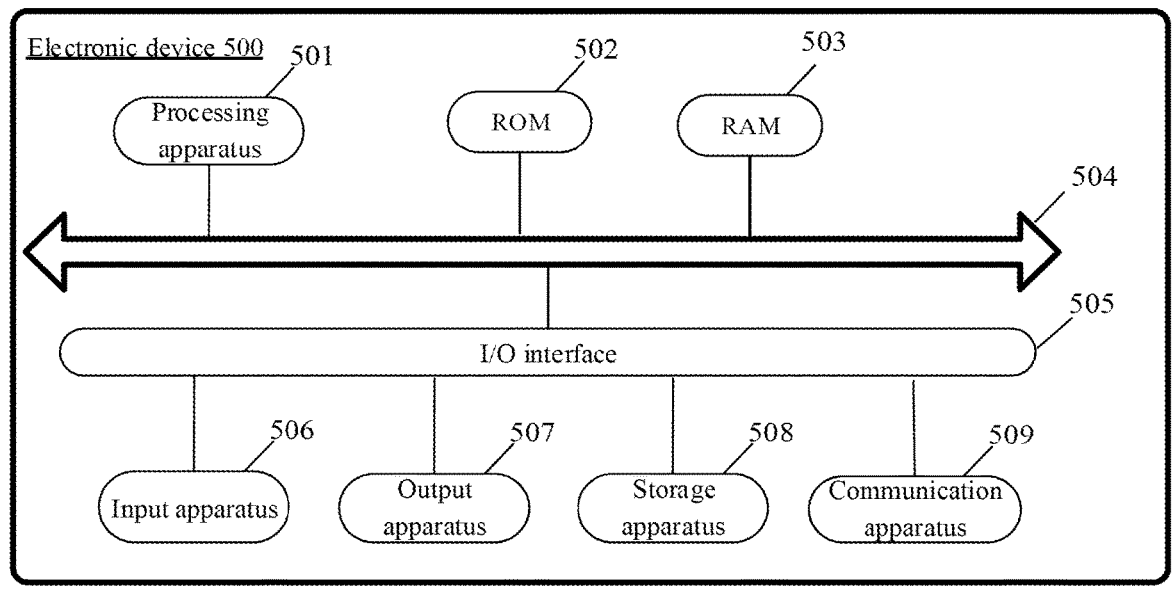
FIG. 5 is a hardware structural diagram of a positioning device provided by one or more embodiments of the present disclosure.

Refer to FIG. 5, which shows a schematic structural diagram of an electronic device 500 suitable for implementing the present disclosure embodiment, the electronic device 500 can be a head-mounted AR device, a terminal device, or a server. Here, the terminal device may include, but is not limited to, a mobile terminal such as a mobile phone, a notebook computer, a digital broadcast receiver, a personal digital assistant (PDA), a portable android device (PAD), a portable multimedia player (PMP), a vehicle terminal (e.g. a vehicle navigation terminal), etc., and a fixed terminal such as a digital TV, a desktop computer, and the like. The electronic device shown in FIG. 5 is only one example and should not impose any limitation on the function and scope of use of the embodiments of the present disclosure.

As shown in FIG. 5, the electronic device 500 may include a processing apparatus (e.g. a central processor, a graphic processor, etc.) 501 that may execute various suitable actions and processes in accordance with a program stored in a read only memory (ROM) 502 or a program loaded from a storage apparatus 508 into a random access memory (RAM) 503. In the RAM 503, various programs and data required for the operation of the electronic device 500 are also stored. The processing apparatus 501, the ROM 502, and the RAM 503 are connected to each other via a bus 504. An input/output (I/O) interface 505 is also connected to a bus 504.

In general, the following apparatus may be connected to the I/O interface 505: an input apparatus 506 including, for example, a touch screen, a touch pad, a keyboard, a mouse, a camera, a microphone, an accelerometer, a gyroscope, etc.; an output apparatus 507 including, for example, a liquid crystal display (LCD), a speaker, a vibrator, etc.; a storage apparatus 508 including, for example, a magnetic tape, a hard disk, etc.; and a communication apparatus 509. The communication apparatus 509 may allow the electronic device 500 to communicate in a wireless or wired manner with other apparatuses to exchange data. Although FIG. 5 illustrates an electronic device 500 having various apparatuses, it is to be understood that not all illustrated apparatuses are required to be implemented or provided. More or fewer apparatuses may alternatively be implemented or provided.

In particular, processes described above with reference to flow diagrams may be implemented as computer software programs in accordance with the embodiments of the present disclosure. For example, one or more embodiments of the present disclosure include a computer program product including a computer program borne on a computer-readable medium, the computer program includes program codes for executing the method illustrated in the flow diagrams. In such embodiments, the computer program may be downloaded and installed from a network via the communication apparatus 509, or installed from the storage apparatus 508, or installed from the ROM 502. The computer program, when executed by the processing apparatus 501, executes the above functions defined in the method of the embodiments of the present disclosure.

It needs to be noted that the computer-readable medium described above in the present disclosure can be either a computer-readable signal medium or a computer-readable storage medium or any combination of the two. The computer-readable storage medium can be, for example, but not limited to, an electronic, magnetic, optical, electromagnetic, infrared, or semiconductor system, apparatus, or component, or a combination of any of the foregoing. More specific examples of the computer-readable storage medium may include, but are not limited to: an electrical connection having one or more leads, a portable computer diskette, a hard disk, a random access memory (RAM), a read only memory (ROM), an erasable programmable read only memory (EPROM or flash memory), an optical fiber, a portable compact disc read only memory (CD-ROM), an optical storage apparatus, a magnetic storage apparatus, or any suitable combination thereof. In the present disclosure, the computer-readable storage medium may be any tangible medium that can contain or store a program. The program can be used by or in connection with an instruction execution system, apparatus, or component. In the present disclosure, a computer-readable signal medium may include a data signal, in which a computer-readable program code is borne, propagated in the baseband or as part of a carrier. Such propagated data signals may take many forms, including but not limited to electromagnetic signals, optical signals, or any suitable combination of the preceding. The computer-readable signal medium can also be any computer-readable medium other than the computer-readable storage medium. The computer-readable signal medium may send, propagate, or transmit a program for use by or in combination with an instruction execution system, apparatus, or component. The program code contained in the computer-readable medium can be transmitted with any appropriate medium, including but not limited to: a wire, an optical cable, RF (radio frequency), etc., or any appropriate combination of the foregoing.

The computer-readable medium may be included in the electronic device, or it may also exist respectively and not fitted into the electronic device.

The computer-readable medium bears one or more programs which, when executed by the electronic device, cause the electronic device to execute the method shown in the embodiments described above.

The computer program code for executing the operations of the present disclosure may be written in one or more programming languages or a combination thereof. The programming languages include object-oriented programming languages such as Java, Smalltalk, C++, and conventional procedural programming languages such as "C" language or similar programming languages. The program code can be executed completely on a user computer, partially on the user computer, as one independent software package, partially on the user computer and partially on a remote computer, or completely on the remote computer or server. In the case involving a remote computer, the remote computer may be connected to the user computer through any kind of network, including a local area network LAN) or a wide area network (WAN), or may be connected to an external computer (e.g. through an Internet connection by using an Internet service provider).

The flowcharts and block diagrams in the drawings illustrate the architecture, functionality, and operation of possible implementations of a system, a method, and a computer program product according to various embodiments of the present disclosure. In this regard, each block in the flowchart or block diagram may represent one module, a program segment, or a portion of the code, which contains one or more executable instructions for implementing the specified logical function. It should also be noted that in some implementations, the functions noted in the blocks may occur out of the order noted in the figures. For example, two successive blocks may in fact be executed substantially in parallel, or they may sometimes be executed in the reverse order, depending upon the functionality involved. It should also be noted that each block in the block diagram and/or flowchart, and the combination of the block(s) in the block diagram and/or flowchart, can be implemented by a dedicated hardware-based system that executes the specified function or operation, or can be realized by a combination of dedicated hardware and computer instructions.

The elements involved in the embodiments of the present disclosure can be realized by software or hardware. Where the name of the unit does not in some cases constitute a limitation on the unit itself, for example, the first acquisition unit may also be described as "a unit acquiring at least two Internet Protocol addresses".

The functions described herein above may be executed, at least in part, by one or more hardware logic parts. For example, without limitation, exemplary types of hardware logic parts that may be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the preceding. More specific examples of a machine-readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the preceding.

In a first aspect, according to one or more embodiments of the present disclosure, a positioning method is provided, including:

extracting multiple light spots from a current image frame, wherein the current image frame is an image currently collected by an extended reality device;

determining an interference light spot in the multiple light spots according to information about a historical interference light spot, and removing the interference light spot in the multiple light spots, wherein the historical interference light spot is obtained by recognizing a light spot of a historical image frame;

recognizing whether there is a light spot of a luminous light source in remaining light spots after removing the interference light spot, wherein the luminous light source is a light source set on a human-computer interaction apparatus, and the human-computer interaction apparatus is used for a user to interact with the extended reality device;

determining a current pose of the human-computer interaction apparatus according to the light spot of the luminous light source recognized in the remaining light spots.

According to one or more embodiments of the present disclosure, where determining the interference light spot in the multiple light spots according to the information about the historical interference light spot, includes:

mapping an interference light spot in a result of historical light spot recognition to the current image frame;

recognizing the interference light spot from the multiple current light spots according to a result of the mapping.

According to one or more embodiments of the present disclosure, where recognizing whether there is the light spot of the luminous light source in the remaining light spots after removing the interference light spot, includes:

recognizing, based on an arrangement characteristics of luminous light sources set on the human-computer interaction apparatus, whether there is the light spot of the luminous light source from the remaining light spots;

wherein determining the current pose of the human-computer interaction apparatus according to the light spot of the luminous light source recognized in the remaining light spots, comprises:

determining a serial number corresponding to a respective light spot of a luminous light source according to serial numbers of multiple luminous light sources forming the arrangement characteristics;

determining the pose of the human-computer interaction apparatus according to position information of the light spot of the luminous light source whose serial number is determined.

According to one or more embodiments of the present disclosure, wherein the number of luminous light sources set on the human-computer interaction apparatus is more than two, the more than two luminous light sources form at least one light source combination;

wherein recognizing, based on the arrangement characteristics of the luminous light sources set on the human-computer interaction apparatus, whether there is the light spot of the luminous light source from multiple light spots with the interference light spot removed, comprises:

determining at least one light spot combination of composed of the remaining light spots;

for each light spot combination:

determining a distribution characteristics of light spots in the light spot combination, and performing matching between the distribution characteristics of the light spots in the light spot combination and a light source arrangement characteristics corresponding to the at least one light source combination respectively;

if the matching is successful, taking a light spot in the light spot combination as the light spot of the luminous light source;

wherein determining the current pose of the human-computer interaction apparatus according to the light spot of the luminous light source recognized in the remaining light spots, comprises:

determining a serial number of a respective light spot in the light spot combination according to a serial number of a respective light source in a light source combination successfully matched with the light spot combination;

determining the current pose of the human-computer interaction apparatus according to position information of the respective light spot in the light spot combination for which the serial number of the respective light spot is determined.

According to one or more embodiments of the present disclosure, wherein there are more than two light spot combinations successfully matched with the light source arrangement characteristics corresponding to the at least one light source combination respectively;

wherein determining the current pose of the human-computer interaction apparatus according to the light spot of the luminous light source recognized in the remaining light spots, comprises:

determining a target light spot combination from the more than two light spot combinations according to a preset matching threshold;

determining a serial number of a respective light spot in the target light spot combination according to a serial number of a light source combination corresponding to the target light spot combination;

determining the current pose of the human-computer interaction apparatus according to position information of the respective light spot in the target light spot combination for which the serial number of the respective light spot is determined.

According to one or more embodiments of the present disclosure, the positioning method further includes:

for a next image frame, determining a pose of the human-computer interaction apparatus corresponding to the next image frame using position information of the respective light spot in the target light spot combination.

According to one or more embodiments of the present disclosure, the positioning method further includes:

if the light spot of the luminous light source is not recognized in the remaining light spots, taking the remaining light spots as interference light spots corresponding to the current image frame, and updating the information about the historical interference light spot according to information about the interference light spots corresponding to the current image frame.

According to a second aspect, one or more embodiments of the present disclosure provide a positioning device, including:

an extracting unit, configured to extract multiple light spots from a current image frame, wherein the current image frame is an image currently collected by an extended reality device;

a first determining unit, configured to determine an interference light spot in the multiple light spots according to information about a historical interference light spot, and removing the interference light spot in the multiple light spots, wherein the historical interference light spot is obtained by recognizing a light spot of a historical image frame;

an recognizing unit, configured to recognize whether there is a light spot of a luminous light source in remaining light spots after removing the interference light spot, wherein the luminous light source is a light source set on a human-computer interaction apparatus, and the human-computer interaction apparatus is used for a user to interact with the extended reality device;

a second determining unit, configured to determine a current pose of the human-computer interaction apparatus according to the light spot of the luminous light source recognized in the remaining light spots.

According to one or more embodiments of the present disclosure, the first determining unit is specifically configured to: map an interference light spot in a result of historical light spot recognition to the current image frame; and recognize the interference light spot from the multiple current light spots according to a result of the mapping.

According to one or more embodiments of the present disclosure, the recognizing unit is specifically configured to recognize, based on an arrangement characteristics of luminous light sources set on the human-computer interaction apparatus, whether there is the light spot of the luminous light source from the remaining light spots; and the second determining unit is specifically configured to determine a serial number corresponding to a respective light spot of a luminous light source according to serial numbers of multiple luminous light sources forming the arrangement characteristics; determining the pose of the human-computer interaction apparatus according to position information of the light spot of the luminous light source whose serial number is determined.

According to one or more embodiments of the present disclosure, the number of luminous light sources set on the human-computer interaction apparatus is more than two, the more than two luminous light sources form at least one light source combination; the recognizing unit is specifically configured to determine at least one light spot combination of composed of the remaining light spots; for each light spot combination: determining a distribution characteristics of light spots in the light spot combination, and performing matching between the distribution characteristics of the light spots in the light spot combination and a light source arrangement characteristics corresponding to the at least one light source combination respectively; if the matching is successful, taking a light spot in the light spot combination as the light spot of the luminous light source; the second determining unit is specifically configured to determine a serial number of a respective light spot in the light spot combination according to a serial number of a respective light source in a light source combination successfully matched with the light spot combination; determine the current pose of the human-computer interaction apparatus according to position information of the respective light spot in the light spot combination for which the serial number of the respective light spot is determined.

According to one or more embodiments of the present disclosure, there are more than two light spot combinations successfully matched with the light source arrangement characteristics corresponding to the at least one light source combination respectively; the second determining unit is specifically configured to determine a target light spot combination from the more than two light spot combinations according to a preset matching threshold; determine a serial number of a respective light spot in the target light spot combination according to a serial number of a light source combination corresponding to the target light spot combination; determine the current pose of the human-computer interaction apparatus according to position information of the respective light spot in the target light spot combination for which the serial number of the respective light spot is determined.

According to one or more embodiments of the present disclosure, the second determining unit is specifically configured to determine, for a next image frame, a pose of the human-computer interaction apparatus corresponding to the next image frame using position information of the respective light spot in the target light spot combination.

According to one or more embodiments of the present disclosure, the positioning device further includes an updating unit (not shown in the drawings). The updating unit is configured to: if the light spot of the luminous light source is not recognized in the remaining light spots, take the remaining light spots as interference light spots corresponding to the current image frame, and update the information about the historical interference light spot according to information about the interference light spots corresponding to the current image frame.

According to a third aspect, one or more embodiments of the present disclosure provide an electronic device, including a processor and a memory;

a memory stores computer execution instructions;

a processor executes the computer execution instructions stored in the memory, so that the processor executes the positioning method as described in the first aspect and various possible designs of the first aspect.

According to a fourth aspect, one or more embodiments of the present disclosure provide a computer-readable storage medium in which computer execution instructions are stored, when a processor executes the computer execution instructions, the positioning method as described in the first aspect and various possible designs of the first aspect is implemented.

According to a fifth aspect, one or more embodiments of the present disclosure provide a computer program product including a computer program, when the computer program is executed by a processor, the positioning method as described in the first aspect and various possible designs of the first aspect is implemented.

The above description is only a preferred embodiment of the present disclosure and an explanation of the applied technical principles. Those skilled in the art should understand that the disclosure scope involved in the present disclosure is not limited to the technical solutions formed by a specific combination of the above technical features, but should also cover other technical solutions formed by a random combination of the above technical features or equivalent features thereof without departing from the above-disclosed concept. For example, a technical solution formed by replacing the above-mentioned features and the technical features disclosed in (but not limited to) the present disclosure having similar functions with each other.

Further, while operations are depicted in a particular order, this should not be construed as requiring the operations to be executed in the particular order shown or in sequential order. Under certain circumstances, multitasking and parallel processing may be advantageous. Likewise, several specific implementation details have been included in the above discussion, but these should not be construed as limiting the scope of the present disclosure. Certain features that are described in the context of separate embodiments may also be implemented in combination in a single embodiment. Conversely, various features that are described in the context of a single embodiment can also be implemented in multiple embodiments respectively or in any suitable sub-combination.

Although the subject matter has been described in language specific to structural features and/or method and logical acts, it should be understood that the subject matter defined in the appended claims is not necessarily limited to the specific features or acts described above. Rather, the specific features and acts described above are merely exemplary forms for implementing the claims.

What is claimed is:

1. A positioning method, comprising:
   extracting multiple light spots from a current image frame, wherein the current image frame is an image currently collected by an extended reality device;
   determining an interference light spot in the multiple light spots according to information about a historical interference light spot, and removing the interference light spot in the multiple light spots, wherein the historical interference light spot is obtained by recognizing a light spot of a historical image frame;
   recognizing whether there is a light spot of a luminous light source in remaining light spots after removing the interference light spot, wherein the luminous light source is a light source set on a human-computer interaction apparatus, and the human-computer interaction apparatus is used for a user to interact with the extended reality device;
   determining a current pose of the human-computer interaction apparatus according to the light spot of the luminous light source recognized in the remaining light spots.

2. The method according to claim 1, wherein determining the interference light spot in the multiple light spots according to the information about the historical interference light spot, comprises:
   mapping an interference light spot in a result of historical light spot recognition to the current image frame;
   recognizing the interference light spot from the multiple current light spots according to a result of the mapping.

3. The method according to claim 2, further comprising:
   if the light spot of the luminous light source is not recognized in the remaining light spots, taking the remaining light spots as interference light spots corresponding to the current image frame, and updating the information about the historical interference light spot according to information about the interference light spots corresponding to the current image frame.

4. The method according to claim 1, wherein recognizing whether there is the light spot of the luminous light source in the remaining light spots after removing the interference light spot, comprises:
   recognizing, based on an arrangement characteristics of luminous light sources set on the human-computer interaction apparatus, whether there is the light spot of the luminous light source from the remaining light spots;
   wherein determining the current pose of the human-computer interaction apparatus according to the light spot of the luminous light source recognized in the remaining light spots, comprises:
   determining a serial number corresponding to a respective light spot of a luminous light source according to serial numbers of multiple luminous light sources forming the arrangement characteristics;
   determining the pose of the human-computer interaction apparatus according to position information of the light spot of the luminous light source whose serial number is determined.

5. The method according to claim 4, wherein a number of luminous light sources set on the human-computer interaction apparatus is more than two, the more than two luminous light sources form at least one light source combination;
   wherein recognizing, based on the arrangement characteristics of the luminous light sources set on the human-computer interaction apparatus, whether there is the light spot of the luminous light source from multiple light spots with the interference light spot removed, comprises:
   determining at least one light spot combination of composed of the remaining light spots;
   for each light spot combination:
   determining a distribution characteristics of light spots in the light spot combination, and performing matching between the distribution characteristics of the light spots in the light spot combination and a light source arrangement characteristics corresponding to the at least one light source combination respectively;
   if the matching is successful, taking a light spot in the light spot combination as the light spot of the luminous light source;
   wherein determining the current pose of the human-computer interaction apparatus according to the light spot of the luminous light source recognized in the remaining light spots, comprises:
   determining a serial number of a respective light spot in the light spot combination according to a serial number of a respective light source in a light source combination successfully matched with the light spot combination;
   determining the current pose of the human-computer interaction apparatus according to position information of the respective light spot in the light spot combination for which the serial number of the respective light spot is determined.

6. The method according to claim 5, wherein there are more than two light spot combinations successfully matched with the light source arrangement characteristics corresponding to the at least one light source combination respectively;
   wherein determining the current pose of the human-computer interaction apparatus according to the light spot of the luminous light source recognized in the remaining light spots, comprises:
   determining a target light spot combination from the more than two light spot combinations according to a preset matching threshold;
   determining a serial number of a respective light spot in the target light spot combination according to a serial number of a light source combination corresponding to the target light spot combination;
   determining the current pose of the human-computer interaction apparatus according to position information of the respective light spot in the target light spot combination for which the serial number of the respective light spot is determined.

7. The method according to claim 6, further comprising:
   for a next image frame, determining a pose of the human-computer interaction apparatus corresponding to the next image frame using position information of the respective light spot in the target light spot combination.

8. The method according to claim 7, further comprising:
   if the light spot of the luminous light source is not recognized in the remaining light spots, taking the remaining light spots as interference light spots corresponding to the current image frame, and updating the information about the historical interference light spot according to information about the interference light spots corresponding to the current image frame.

9. The method according to claim 4, further comprising:
if the light spot of the luminous light source is not recognized in the remaining light spots, taking the remaining light spots as interference light spots corresponding to the current image frame, and updating the information about the historical interference light spot according to information about the interference light spots corresponding to the current image frame.

10. The method according to claim 5, further comprising:
if the light spot of the luminous light source is not recognized in the remaining light spots, taking the remaining light spots as interference light spots corresponding to the current image frame, and updating the information about the historical interference light spot according to information about the interference light spots corresponding to the current image frame.

11. The method according to claim 6, further comprising:
if the light spot of the luminous light source is not recognized in the remaining light spots, taking the remaining light spots as interference light spots corresponding to the current image frame, and updating the information about the historical interference light spot according to information about the interference light spots corresponding to the current image frame.

12. The method according to claim 1, further comprising:
if the light spot of the luminous light source is not recognized in the remaining light spots, taking the remaining light spots as interference light spots corresponding to the current image frame, and updating the information about the historical interference light spot according to information about the interference light spots corresponding to the current image frame.

13. An electronic device, comprising a processor and a memory;
the memory stores computer execution instructions;
the processor executes the computer execution instructions stored in the memory; wherein the computer execution instructions, when executed by the processor, cause the processor to:
extract multiple light spots from a current image frame, wherein the current image frame is an image currently collected by an extended reality device;
determine an interference light spot in the multiple light spots according to information about a historical interference light spot, and remove the interference light spot in the multiple light spots, wherein the historical interference light spot is obtained by recognizing a light spot of a historical image frame;
recognize whether there is a light spot of a luminous light source in remaining light spots after removing the interference light spot, wherein the luminous light source is a light source set on a human-computer interaction apparatus, and the human-computer interaction apparatus is used for a user to interact with the extended reality device;
determine a current pose of the human-computer interaction apparatus according to the light spot of the luminous light source recognized in the remaining light spots.

14. The electronic device according to claim 13, wherein the processor is caused to:
map an interference light spot in a result of historical light spot recognition to the current image frame;
recognize the interference light spot from the multiple current light spots according to a result of the mapping.

15. The electronic device according to claim 13, wherein the processor is caused to:
recognize, based on an arrangement characteristics of luminous light sources set on the human-computer interaction apparatus, whether there is the light spot of the luminous light source from the remaining light spots;
wherein the processor is caused to:
determine a serial number corresponding to a respective light spot of a luminous light source according to serial numbers of multiple luminous light sources forming the arrangement characteristics;
determine the pose of the human-computer interaction apparatus according to position information of the light spot of the luminous light source whose serial number is determined.

16. The electronic device according to claim 15, wherein a number of luminous light sources set on the human-computer interaction apparatus is more than two, the more than two luminous light sources form at least one light source combination;
wherein the processor is caused to:
determine at least one light spot combination of composed of the remaining light spots;
for each light spot combination:
determine a distribution characteristics of light spots in the light spot combination, and perform matching between the distribution characteristics of the light spots in the light spot combination and a light source arrangement characteristics corresponding to the at least one light source combination respectively;
if the matching is successful, taking a light spot in the light spot combination as the light spot of the luminous light source;
wherein the processor is caused to:
determine a serial number of a respective light spot in the light spot combination according to a serial number of a respective light source in a light source combination successfully matched with the light spot combination;
determine the current pose of the human-computer interaction apparatus according to position information of the respective light spot in the light spot combination for which the serial number of the respective light spot is determined.

17. The electronic device according to claim 16, wherein there are more than two light spot combinations successfully matched with the light source arrangement characteristics corresponding to the at least one light source combination respectively;
wherein the processor is caused to:
determine a target light spot combination from the more than two light spot combinations according to a preset matching threshold;
determine a serial number of a respective light spot in the target light spot combination according to a serial number of a light source combination corresponding to the target light spot combination;
determine the current pose of the human-computer interaction apparatus according to position information of the respective light spot in the target light spot combination for which the serial number of the respective light spot is determined.

18. The electronic device according to claim 17, wherein the processor is further caused to:
for a next image frame, determine a pose of the human-computer interaction apparatus corresponding to the next image frame using position information of the respective light spot in the target light spot combination.

19. The electronic device according to claim 13, wherein the processor is caused to:

if the light spot of the luminous light source is not recognized in the remaining light spots, take the remaining light spots as interference light spots corresponding to the current image frame, and update the information about the historical interference light spot according to information about the interference light spots corresponding to the current image frame.

20. A non-transitory computer-readable storage medium in which computer execution instructions are stored, when a processor executes the computer execution instructions, the positioning method comprising the following steps is implemented:

extracting multiple light spots from a current image frame, wherein the current image frame is an image currently collected by an extended reality device;

determining an interference light spot in the multiple light spots according to information about a historical interference light spot, and removing the interference light spot in the multiple light spots, wherein the historical interference light spot is obtained by recognizing a light spot of a historical image frame;

recognizing whether there is a light spot of a luminous light source in remaining light spots after removing the interference light spot, wherein the luminous light source is a light source set on a human-computer interaction apparatus, and the human-computer interaction apparatus is used for a user to interact with the extended reality device;

determining a current pose of the human-computer interaction apparatus according to the light spot of the luminous light source recognized in the remaining light spots.

* * * * *